(12) United States Patent
Lehtinen et al.

(10) Patent No.: US 8,474,736 B2
(45) Date of Patent: Jul. 2, 2013

(54) METHOD AND DEVICE FOR PRODUCING CHAFF AND WOOD COMPOSITE MATERIAL

(75) Inventors: Liisa Lehtinen, Lahti (FI); Sami Kirvesoja, Hollola (FI); Jari Nisula, Lahti (FI)

(73) Assignee: UPM-Kymmene Oyj, Helsinki (FI)

( * ) Notice: Subject to any disclaimer, the term of this patent is extended or adjusted under 35 U.S.C. 154(b) by 433 days.

(21) Appl. No.: 12/445,700

(22) PCT Filed: Sep. 25, 2007

(86) PCT No.: PCT/FI2007/050517
§ 371 (c)(1),
(2), (4) Date: Oct. 20, 2010

(87) PCT Pub. No.: WO2008/046956
PCT Pub. Date: Apr. 24, 2008

(65) Prior Publication Data
US 2011/0024530 A1 Feb. 3, 2011

(30) Foreign Application Priority Data

Oct. 19, 2006 (FI) .................................... 20060923

(51) Int. Cl.
*B02C 23/00* (2006.01)
(52) U.S. Cl.
USPC ............................................ 241/23; 241/29
(58) Field of Classification Search
USPC ........... 241/23, 29, 66, 65, 152.1, 134, 101.8, 241/80, 78
See application file for complete search history.

(56) References Cited

U.S. PATENT DOCUMENTS

| 3,718,536 | A | | 2/1973 | Downs et al. | |
|---|---|---|---|---|---|
| 3,885,744 | A | * | 5/1975 | Drage | 241/23 |
| 4,874,095 | A | | 10/1989 | Warych | |
| 5,505,390 | A | | 4/1996 | Rodgers | |
| 6,446,887 | B1 | | 9/2002 | Swisher, Jr. et al. | |
| 7,900,857 | B2 | * | 3/2011 | Medoff | 241/23 |
| 2002/0034629 | A1 | | 3/2002 | Jones | |
| 2004/0155127 | A1 | | 8/2004 | Kapper | |
| 2011/0203170 | A1 | * | 8/2011 | Quaranta | 47/9 |

FOREIGN PATENT DOCUMENTS

| CN | 1228729 A | 9/1999 |
|---|---|---|
| CN | 2618669 Y | 6/2004 |
| DE | 42 07 060 A1 | 9/1993 |
| EP | 0 044 507 | 1/1982 |
| EP | 0 607 564 A2 | 7/1994 |
| JP | 2000-027431 A | 1/2000 |
| JP | 2004-155980 A | 6/2004 |
| JP | 2006-240234 A | 9/2006 |
| WO | WO 98/01275 A1 | 1/1998 |

OTHER PUBLICATIONS

Chinese Office Action for Chinese Patent Application No. 200780038425.X mailed Mar. 23, 2011.
Finnish Search Report, Application No. FI 20060049, Jan. 28, 2009.
Japanese Office Action for corresponding Japanese Patent Application No. 2009-532831 mailed Dec. 10, 2012.

* cited by examiner

*Primary Examiner* — Faye Francis
(74) *Attorney, Agent, or Firm* — Merchant & Gould P.C.

(57) ABSTRACT

The invention relates to a method and a device for producing chaff used in the production of a wood composite material. In accordance with the invention, adhesive laminate waste comprising adhesive material, glue and release material is arranged into chaff in multiple steps and the adhesive properties of the glue are killed.

10 Claims, 1 Drawing Sheet

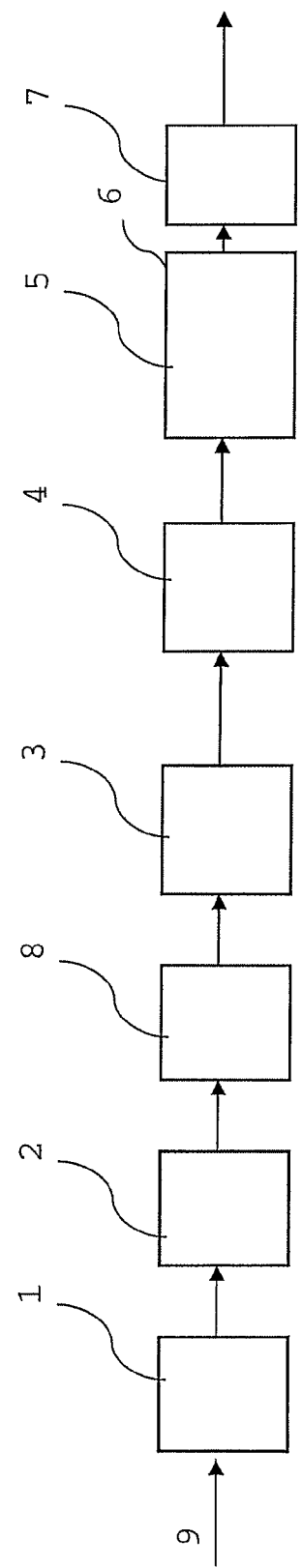

METHOD AND DEVICE FOR PRODUCING CHAFF AND WOOD COMPOSITE MATERIAL

This application is a National Stage Application of PCT/FI2007/050517, filed 25 Sep. 2007, which claims benefit of Ser. No. 20060923, filed 19 Oct. 2006 in Finland and which applications are incorporated herein by reference. To the extent appropriate, a claim of priority is made to each of the above disclosed applications.

BACKGROUND OF THE INVENTION

Known from prior art are various extrusion methods in which a plastic starting material is melted, mixed with optional additives and colorants and extruded through a die of a certain profile in order to form a product. When emerging from the die, the product is in, or close to, its final shape. From the die, the product can be led to a calibration unit, where it is provided accurate and final dimensions, and further to a water reservoir functioning as a cooler. The product is sawed into the desired size on the production line. The starting material is most often fed into the extruder in granulate or powder form.

Also known from prior art are different kinds of wood-plastic composite materials and methods for their production. Wood-plastic composites produced by the extrusion method are made by adding a wood-based constituent and different kinds of processing auxiliaries as fillers to the matrix plastic. The wood-based constituents used are typically sawdust but may also be wood chips or chemical pulp fibre. The starting materials are normally fed as granulates into the extrusion. The wood-based starting material as well as the plastic must therefore be first extruded in separate processes into granulates. Additional processing increases production costs. However, it is possible to feed the starting material components as such into the extruder and make them into products. This requires the use of different kinds of force feed devices to ensure a steady feed despite heterogeneity and low specific density of the starting material. The method is called direct feed.

When it is desirable that the wood-based constituent added to the matrix reinforces the profile, the fibre length and shape of the added constituent must be taken into account. The sawdust used in wood-plastic composites is so sized and shaped that it does not actually reinforce the product but instead functions merely as a filler in the plastic matrix.

Sawdust or wood chips normally require drying before the actual processing, because high moisture content in the filler impairs the quality of the manufactured product. The water vapour which is gasified in the process produces gas bubbles to the profile, which have effect on the look of the product as well as its mechanical properties. Drying, which is performed as an additional process, is an unwanted step due to additional costs, but also to the risk of explosion.

Known from prior art is also the manufacture of wood composites from wood waste arranged in the form of pellets, and from recycling plastic. Also known from publication U.S. Pat. No. 4,874,095 is the manufacture of wood composite materials from paper and thermoplastic material, and from publications U.S. 20020034629 and U.S. Pat. No. 3,718,536 the manufacture of a wood composite material from wood-based and plastic-based materials.

OBJECTIVE OF THE INVENTION

The objective of the invention is to eliminate the drawbacks referred to above. One specific objective of the invention is to disclose a new type of method and a device for producing waste chaff required in the production of a wood composite material, and further for producing a wood composite material. Another objective of the invention is to disclose a novel method and an apparatus for processing adhesive laminate waste.

SUMMARY OF THE INVENTION

The method and the device in accordance with the invention are characterized by what has been presented in the claims.

The invention is based on a method for producing chaff for the production of a wood composite material. In accordance with the invention, adhesive laminate waste comprising adhesive material, glue and release material is arranged into chaff in multiple steps, and the adhesive properties of the glue are killed in the method.

The invention is also based on a device for producing chaff. In accordance with the invention, the device comprises at least two crushers for chopping the adhesive laminate waste containing adhesive material, glue and release material, and the apparatus comprises heat adjusting means for adjusting the temperature of the crushers.

Furthermore, the invention is based on a method for producing a wood composite material from the above-mentioned chaff. In the method, predetermined additives are mixed with the chaff and the chaff is arranged into a wood composite product. In the method, the wood composite material is produced preferably without pre-granulating the starting materials into pellets. In one embodiment, the wood composite material product is extruded from the chaff. Alternatively, the wood composite material product may be formed e.g. by die casting, plate pressing or in a similar manner. In one embodiment, the preformed product is cooled.

In one embodiment of the invention, the adhesive laminate waste is formed of adhesive material onto which has been arranged a glue layer, and fitted onto the glue layer, to function as a protective sheet to the glue layer, is the release material that can be easily released at the application site. In one preferred embodiment, the adhesive material and/or the release material comprise a component based on wood fibres and/or a plastic- or a polymer-based or other organic component. In one embodiment, the adhesive and/or the release material is a wood fibre-based paper, paperboard or the like. In one embodiment, the wood fibre-based paper, paperboard or the like comprises or is treated with a plastic- or a polymer-based material. In one embodiment, the adhesive and/or the release material may be formed of a substantially plastic- or polymer-based material. In one embodiment, the release material comprises a silicone-based component. The release material is preferably siliconized.

In one embodiment, the glue is selected from the group consisting of dispersion glue, hot melt glue or mixtures thereof.

In one embodiment of the invention, the adhesive laminate waste is chopped into the desired chaff size in two steps and two crushers. In one embodiment, the adhesive laminate waste is first chopped in a pre-crusher and thereafter in a fine crusher. In one preferred embodiment, the chaff size after the pre-crushing step is from 30 to 100 mm. In one preferred embodiment, the chaff size after the fine crushing step is from 1 to 10 mm.

In one embodiment of the invention, the adhesive properties of the glue contained in the adhesive laminate waste are neutralized through chopping in multiple steps by crushing the waste gradually in more than one steps into chaff and by maintaining the temperature sufficiently low during chopping.

In one embodiment of the invention, the temperature of the formed chaff is less than 60° C., preferably less than 50° C., at the outlet of each crushing step.

In one embodiment of the invention, the adhesive laminate waste chaff is screened into the desired chaff size class substantially in conjunction with the chopping, preferably in conjunction with the fine crushing step. Preferably, the fine crushing device comprises a screen of the desired size class.

In one embodiment of the invention, additional plastic, which may be virgin or recycling plastic, is added to the adhesive laminate waste chaff. In one embodiment, the additional plastic is added before producing the wood composite material, e.g. before extrusion, e.g. in conjunction with the mixing and the mixing device. In one embodiment, the additional plastic is added substantially in conjunction with the production, e.g. in conjunction with the extrusion, either in one flow with the waste or in a separate flow.

In one embodiment, the additives are added to the chaff before or in conjunction with the production of the wood composite material, e.g. before and/or in conjunction with the extrusion. In one embodiment, the adhesive laminate waste and the additives, and in one embodiment, also the additional plastic, can be mixed into a preferably homogeneous mixture in a mixing device before producing the wood composite material.

In one embodiment, the additive used may be a coupling agent, e.g. MAPP (maleic anhydride derivative), for improving the adhesion between the adhesive laminate chaff and the polymer/plastic, talc for smoothing the surface and creating rigidity, a colorant, a slip agent, an anti-mildew agent, a fire retardant and/or a uv-stabilizer.

Preferably, the additives and/or the additional plastic are added in a predetermined amount relative to the amount of the adhesive laminate waste or of the plastic contained therein, and the amount of the additives and/or the additional plastic to be fed is adjusted by means of a dosing device.

In one embodiment of the invention, the chaff is homogenized before adding the additives.

In one embodiment, the initial temperature of the extruder is adjusted to over 180° C., in one embodiment to over 200° C., in one preferred embodiment from 200 to 240° C. Preferably, the temperature profile of the extruder is adjusted to be sharply declining.

Any extruder device known per se, e.g. a double-screw extruder, may be used conjunction with this invention. Preferably, the product is shaped in conjunction with the extrusion.

In one embodiment, the apparatus comprises at least one conveyor, e.g. a belt conveyor, for transferring the feed material and/or the chaff into or between different devices, or for transferring the product out of the apparatus.

Preferably, the adhesive properties of the glue contained in the adhesive laminate waste are neutralized, i.e. killed, through pre-processing in multiple steps by crushing the waste gradually in more than one steps/crushers into chaff, preferably in a pre- and a fine crusher, and by maintaining the temperature sufficiently low during crushing, preferably below 60° C., more preferably below 50° C. In pre-processing, the adhesive properties of the glue are killed, but the glue particles released in the extrusion process are utilized as slip agents. It is commonly known that in order to achieve economical production rates, a slip agent must be added as an auxiliary to the traditional wood-plastic composites, which increases production costs. When adhesive laminate waste is used as the starting material, separate slip agents are not necessarily needed. Adhesive laminates comprise different kinds of dispersion and hot-melt glues and silicones which function as slip agents as they melt in the reprocessing.

The method and the device in accordance with the invention are suitable for processing different kinds of adhesive laminate waste material, for producing chaff and for making wood composites.

The method and the apparatus in accordance with the invention allow the simultaneous disposal of complex glue-containing adhesive laminate waste and production of a utilizable product.

The method and the apparatus in accordance with the invention are very simple, which reduces investment and processing costs.

The production of chaff and wood composite material in accordance with the invention is an extremely environmentally friendly process and promotes the principle of sustained development. The invention provides a product which itself is recycling material and can be utilized as one, also meeting the ever stricter environmental regulations.

DETAILED DESCRIPTION OF THE INVENTION

In the following section, the invention will be described with the aid of a detailed exemplary embodiment, referring to the accompanying flowchart 1, which shows one device in accordance with the invention as combined with an apparatus for producing a wood composite material.

FIG. 1 shows an apparatus for producing a wood composite patio board from adhesive laminate waste.

The device in accordance with the invention comprises a feed device, in this conjunction a belt conveyor 9, for transferring the adhesive laminate waste into a pre-crusher 1. In the pre-crusher 1, the adhesive laminate waste is chopped into a chaff size ranging from 30 to 100 mm. The outlet temperature of the chaff when emerging from the pre-crusher is about 40 to 60° C. The device further comprises at least one fine crusher 2, into which the chaff is led from the pre-crusher 1 by means of the conveyor. In the fine crusher, the chaff is chopped into a smaller chaff size ranging from 2 to 8 mm. Arranged in conjunction with the fine crusher 2 is a screen for defining the particle size to the desired level, however to a size smaller than 8 mm. There may be several adjacently arranged fine crushers. The blade clearances in the fine crushers are adjusted form 0.15 to 0.25 mm. The outlet temperature of the chaff when emerging from the fine crusher may rise up to 80° C. if not specifically limited. The fine crusher may be cooled by means of either water or air. Preferably, the temperature of the chaff after the fine crusher is limited to a temperature below 50° C.

The size and type of the screen apertures is selected based on the chaff and the wood composite material to be produced. Tests have shown that the ratio between the diameter and the depth of an aperture, preferably 1:1, and the ratio between the surface area of the apertures and the surface area of the screen excepting the apertures, preferably from 45 to 60%, are crucial in the undisturbed execution of the screening.

Preferably, the crushers, their efficiency ratios and the chaff size are adjusted in the production of the chaff. If the screen apertures in the pre-crusher are too large, the pre-crusher will not work sufficiently relative to the fine crusher. Accordingly, if the screen apertures in the pre-crusher are too small, the pre-crusher will work too much. The crushers can be cleaned with waste from their own production, with clean wood and/or with talc.

The apparatus in accordance with FIG. 1 comprises a classifier 8 for collecting the desired or specific particle sizes for a specific application.

The apparatus also comprises a homogenization tank 3 for homogenizing the chaff. The desired and predetermined additives and the additional plastic are mixed with the chaff in a mixing device 4, into which the homogenized chaff has been led by the conveyor from the homogenization tank 3.

The apparatus of FIG. 1 comprises a double-screw extruder device 5 into which the chaff mixture is led from the mixing device 4. A shaping unit 6 and cooling 7 for cooling the shaped product are arranged in conjunction with the extruder 5. In this apparatus, cooling is realized by means of water. The initial temperature at the first end of the extruder is adjusted from 200 to 240° C. This allows the use of a relatively rigid additional plastic. The temperature profile of the extruder was adjusted to be sharp; a high temperature at the start and as low as possible at the die of the extruder. The outlet temperature of the shaped product depends on the production rate and the temperature of the cooling water. Preferably, the outlet temperature at the extruder is adjusted to be as low as possible, so that the wood composite product would emerge from the apparatus in the most rigid state possible. At the end of the cooling reservoir, the temperature of the product should be arranged to be low, so that the product would not distort due to after-shrinkage during cooling.

The apparatus in accordance with FIG. 1 enables the processing of adhesive laminate waste at the rate of 100 to 2000 kg/h, preferably 500 to 1500 kg/h.

By crushing the waste gradually in multiple steps and by limiting the temperature during crushing, the adhesive properties of the glue in the adhesive laminate waste can be killed. This guarantees a successful production of the wood composite material, and the desired product will be provided easily and without breaks in the processing.

In summary, the tests have shown that chaff was easily provided from the adhesive laminate waste material, and accordingly wood composite products were easily provided from the chaff, using the method and the apparatus in accordance with the invention.

The method and the device in accordance with the invention are suitable in different embodiments for producing chaff used in the production of different kinds of wood composites from adhesive laminate waste.

The embodiments of the invention are not limited to the examples referred to above; instead many variations are possible within the scope of the accompanying claims.

The invention claimed is:

1. A method for producing chaff, wherein the adhesive laminate waste comprising adhesive material, glue and release material is arranged into chaff in multiple crushing steps, and the adhesive properties of the glue are neutralized by maintaining the temperature sufficiently low during crushing so that the temperature of the formed chaff is below 60° C. at the outlet of each step.

2. The method in accordance with claim 1, wherein the adhesive laminate waste is chopped into the desired chaff size in a pre-crushing step.

3. The method in accordance with claim 1, wherein the chaff size after the pre-crushing step is 30 to 100mm.

4. The method in accordance with claim 1, wherein the adhesive laminate waste is chopped into the desired chaff size in a fine crushing step.

5. The method in accordance with claim 1, wherein the chaff size after the fine crushing step is 1 to 10mm.

6. The method in accordance with claim 1, wherein the temperature of the formed chaff is below 50° C. at the outlet of each step.

7. The method in accordance with claim 1, wherein the adhesive laminate waste is screened into the desired chaff size class in conjunction with the chopping.

8. A method for producing a wood composite material, wherein adhesive laminate waste containing adhesive material, glue and release material is arranged into chaff in multiple crushing steps and adhesive properties of the glue are neutralized by maintaining the temperature sufficiently low during crushing so that the temperature of the chaff formed is below 60° C. at the outlet of each crushing step, predetermined additives are mixed with the chaff, and the chaff is arranged into a wood composite material product.

9. The method in accordance with claim 8, wherein the wood composite material product is extruded, die cast, and/or plate pressed from the chaff.

10. The method in accordance with claim 8, wherein additional plastic is added to the adhesive laminate waste chaff.

* * * * *